United States Patent Office — 3,557,115 — Patented Jan. 19, 1971

3,557,115
2-(2-IMIDAZOLIN AND PYRIMIDIN SUBSTITUTED METHYLTHIO)-IMIDAZOLES AND PYRIMIDINES
Robert E. Manning, Mountain Lakes, N.J., assignor to Sandoz-Wander, Inc., Hanover, N.J., a corporation of Delaware
No Drawing. Filed Nov. 29, 1968, Ser. No. 780,235
Int. Cl. C07d 57/00
U.S. Cl. 260—256.5                                15 Claims

ABSTRACT OF THE DISCLOSURE

Substituted imidazoles, e.g., 2-(2-imidazolin-2-ylmethylthio)-imidazole dihydrochloride, and substituted pyrimidines, e.g., 2 - (2-imidazolin-2-ylmethylthio)pyrimidine hydrochloride. The compounds are useful as hypotensives.

---

This invention relates to imidazoles and pyrimidines. More particularly, it relates to substituted imidazoles and pyrimidines, intermediates thereof and to processes for their preparation.

The compounds of this invention may be represented by the formula

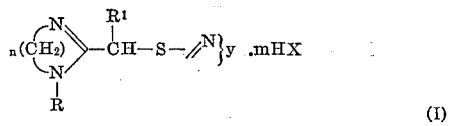

(I)

where
y is

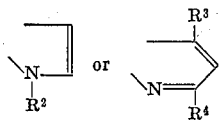

R is H, or lower alkyl having 1 to 3 carbon atoms, e.g., methyl, ethyl, and propyl
$R^1$ is H, lower alkyl having 1 to 3 carbon atoms, e.g. methyl, ethyl, and propyl, or phenyl
$R^2$ is H, or lower alkyl having 1 to 3 carbon atoms, e.g., methyl, ethyl, and propyl
$R^3$ and $R^4$ are each independently H, lower alkyl having 1 to 3 carbon atoms, e.g., methyl, ethyl, and propyl, or $NH_2$,
X is halo having a atomic weight of about 35–80,
n is 2 or 3, and
m is 1 or 2.

The compounds of this invention may also be represente by the formulas

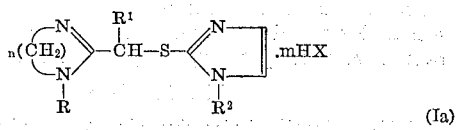

(Ia)

and

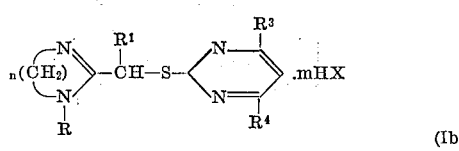

(Ib)

where R, $R^1$, $R^2$, $R^3$, $R^4$, X, n and m have the above stated significance.

The process for preparing the compounds of Formula Ia may be generally represented by the following reaction scheme A:

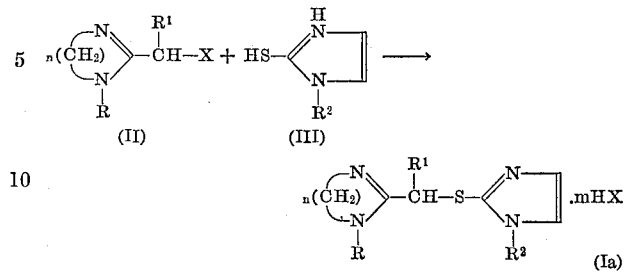

where R, $R^1$, $R^2$, X, n and m have the above stated significance.

The substituted compounds of Formula Ia are prepared by treating a compound of Formula II or its HX salt where X has the above stated significance, e.g., 2-chloromethylimidazoline hydrochloride, with a substituted imidazole of Formula III, e.g., 2-mercaptoimidazole, in an alcohol-acetone, alcohol-ethyl ether or alcohol solvent at a temperature from 15° C. to reflux temperature, preferably 20°–30° C. The ratio of alcohol to acetone or ethyl ether is preferably from 1:4–4:1. The alcohol may be methanol, ethanol, propanol, isopropanol and the like. Neither the temperature of the reaction nor the solvent used is critical.

The process for preparing the compounds of Formula Ib may be represented by the following reaction scheme B:

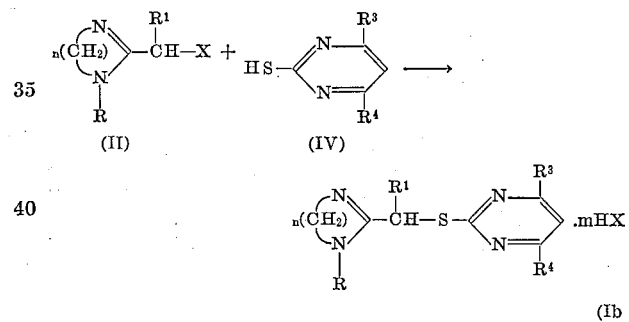

where R, $R^1$, $R^3$, $R^4$, X, n and m have the above stated significance.

The compounds of Formula Ib are prepared by treating a compound of Formula II or its HX salt where X has the above stated significance, e.g. 2-chloromethylimidazoline hydrochloride, with a substituted pyrimidine of Formula IV, e.g. 4,6-diaminopyrimidine. The solvent systems and reaction conditions are the same as for the process of scheme A indicated above.

It should be understood in scheme A and B above, that when compound II is the free base, the monohydrohalides of compounds Ia and Ib are obtained. When compound II is in the salt form, compound Ia and Ib are obtained as the dihydrohalides.

Certain of the compounds of Formulas II, III and IV above are known and are prepared by methods disclosed in the literature. Those not specifically disclosed are prepared from known materials in an analogous manner.

Conventional recovery techniques such as recrystallization may be used to recover the compounds of Formulas Ia and Ib.

The compounds of Formulas Ia and Ib are useful because they possess pharmacological activity in animals. More particularly, the compounds are useful as hypotensive agents as indicated by their activity in the hypertensive rat given orally 100 mg./kg. of animal body weight of the active material. The test method is basically as described by A. Grollman "A Simplified Procedure for Inducing Chronic Renal Hypertension in the Mammal"—Proc. Soc. Exptl. Bio. & Med., vol. 57, p. 102 (1944).

The compounds Ia and Ib may be combined with a pharmaceutically acceptable carrier or adjuvant. They may be administered orally or parenterally. The dosage will vary depending upon the mode of administration utilized and the particular compound employed.

In general satisfactory results are obtained when the compounds are administered at a daily dosage of from about 1.0 to 150 milligrams per kilogram of animal body weight. This daily dosage is preferably given in divided dosage, e.g., 2 to 4 times a day, or in sustained release form. For most large animals, total daily dosage is from about 70 milligrams to 1 gram. Dosage forms suitable for internal administration comprise from about 20 to 500 milligrams of the compound in admixture with a solid or liquid pharmaceutical carrier or diluent.

A representative formulation suitable for oral administration is a tablet prepared by standard tabletting techniques which contain the following:

| Ingredients: | Parts by wt. |
|---|---|
| 2 - (2 - imidazolin - 2 - ylmethylthio)imidazole dihydrochloride | 50 |
| Tragacanth | 2 |
| Lactose | 39.5 |
| Corn starch | 5 |
| Talcum | 3 |
| Magnesium stearate | 0.5 |

This invention is illustrated but not limited by the following examples.

EXAMPLE 1

2-(2-imidazolin-2-ylmethylthio)imidazole dihydrochloride

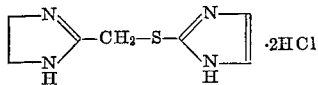

A mixture of 2-chloromethylimidazoline hydrochloride (3.0 g.), 2-mercaptoimidazole (2.0 g.), ethanol (10 ml.) and acetone (30 ml.) was stirred at room temperature for 1½ hours. The resultant solid was collected by filtration and crystallized from methanol-ether (1:3) to give the product, 3.0 g.; M.P. 202–205° C. dec.

EXAMPLE 2

2-(1-methyl-2-imidazolin-2-ylmethylthio)imidazole dihydrochloride

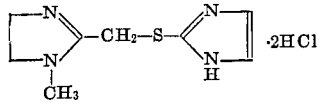

A mixture of 2-chloromethyl-1-methylimidazoline hydrochloride (3.4 g.), 2-mercaptoimidazole (2.0 g.), ethanol (10 ml.) and acetone (30 ml.) was stirred at room temperature for 24 hours. The resultant solid was collected by filtration and crystallized from ethanol-acetone (1:1) to give the product, 1.7 g.; M.P. 207–209° C.

EXAMPLE 3

1-methyl-2-(2-imidazolin-2-ylmethylthio)imidazole dihydrochloride

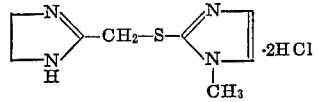

A mixture of 2-chloromethylimidazoline hydrochloride (4.6 g.), 2-mercapto-1-methylimidazole (3.4 g.), ethanol (15 ml.) and acetone (45 ml.) was stirred at room temperature for 64 hours. The resultant solid was collected by filtration and crystallzed from ethanol-acetone (1:1) to give the product, 7.9 g.; M.P. 242–244° C. dec.

EXAMPLE 4

1-methyl-2-[1-(2-imidazolin-2-yl)ethylthio]imidazole dihydrochloride

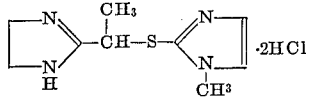

A mixture of 2-α-chloroethylimidazoline hydrochloride (6.8 g.), 2-mercapto-1-methylimidazole (4.5 g.) and ethanol (150 ml.) was stirred at reflux for 48 hours. The reaction mixture was cooled and ether (50 ml.) was added. The resultant solid was collected by filtration to give the product, 9.8 g.; M.P. 235–237° C.

EXAMPLE 5

1-methyl-2-[2-(1-methyl-2-imidazolin-2-yl)methylthio]imidazole dihydrochloride

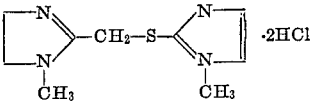

A mixture of 2-chloromethyl-1-methylimidazoline hydrochloride (3.4 g.), 2-mercapto-1-methylimidazole (2.3 g.), ethanol (10 ml.) and acetone (30 ml.) was stirred at room temperature for 18 hours. The resultant solid was collected by filtration and crystallized from ethanol-acetone (1:3) to give the product, 3.1 g., M.P. 223–225° C.

EXAMPLE 6

2-[α-(2-imidazolin-2-yl)benzylthio]imidazole dihydrochloride

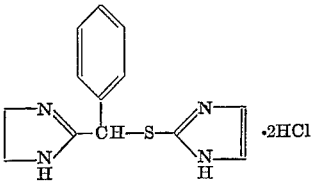

A mixture of 2-α-chlorobenzylimidazoline hydrochloride (2.3 g.), 2-mercaptoimidazole (1.0 g.), ethanol (5 ml.) and acetone (15 ml.) was stirred at room temperature for 20 hours. The resultant solid was stirred at room temperture for 20 hours. The resultant solid was collected by filtration and crystallized from methanol-acetone (1:2) to give the product, 2.1 g., M.P. 212° C. dec.

EXAMPLE 7

2-(2-imidazolin-2-ylmethylthio)pyrimidine hydrochloride

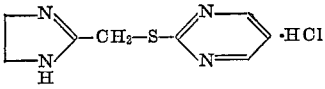

A mixture of 2-chloromethylimidazoline (0.5 g.) and 2-mercaptopyrimidine (0.5 g.) in ethanol (7 ml.) was stirred at room temperature for 1 hour. Ether (7 ml.) was added and the resultant solid was collected by filtration to give the product, 0.8 g., M.P. 162–165° C. dec.

EXAMPLE 8

2-(2-imidazolin-2-ylmethylthio)-4-methyl-pyrimidine hydrochloride

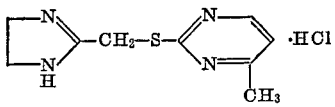

A mixture of 2-chloromethyl imidazoline (1.2 g.), 2-mercapto-4-methylpyrimidine (1.3 g.) and ethanol (10 ml.) was stirred at room temperature for 1 hour. Ether (10 ml.) was aded and the resultant solid was collected by filtration and crystallized from isopropanol-ether (1:2) to give the product, 1.2 g., M.P. 162–164° C. dec.

EXAMPLE 9

4,6-diamino-2-(2-imidazolin-2-ylmethylthio)pyrimidine dihydrochloride

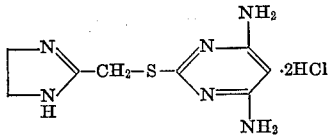

A mixture of 2-chloromethylimidazoline hydrochloride (1.5 g.), 4,6-diaminopyrimidine (1.4 g.) and ethanol (25 ml.) was stirred at room temperature for 48 hours. The resultant solid was collected by filtration and crystallized from methanol-ether (1:3) to give the product, 2.6 g., M.P. 240–242° C. dec.

EXAMPLE 10

2-[α(2-imidazolin-2-ylbenzylthio)]-pyrimidine hydrochloride

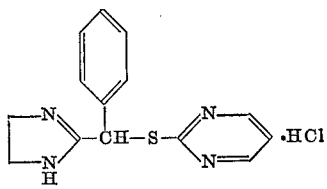

A mixture of 2-α-chlorobenzylimidazoline (3,9 g.), 2-mercaptopyrimidine (2.5 g.) and ethanol (40 ml.) was stirred at room temperature for 42 hours. Acetone (60 ml.) was added and the resultant solid was collected by filtration and crystallized from ethanol-acetone (1:2) to give the product, 3.3 g., M.P. 173–175° C. dec.

EXAMPLE 11

2-(3,4,5,6-tetrahydropyrimidine-2-ylmethylthio) imidazole dihydrochloride

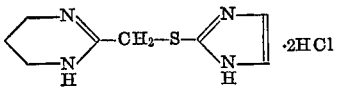

A mixture of 2-chloromethyl-3,4,5,6-tetrahydro pyrimidine hydrochloride (3,4 g.), 2-mercaptoimidazole (2.0 g.), ethanol (10 ml.) and acetone. (30 ml.) was stirred at room temperature for 24 hours. The resultant solid was collected by filtration and crystallized from methanol-acetone (1:1) to give the product, 3.5 g., M.P. 250° C. dec.

EXAMPLE 12

1-methyl-2-(3,4,5,6-tetrahydropyrimidine-2-ylmethylthio) imidazole dihydrochloride

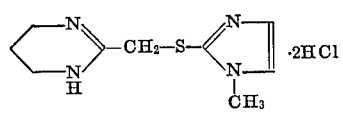

A mixture of 2-chloromethyl-3,4,5,6-tetrahydropyrimidine, hydrochloride (5.1 g.), 2-mercapto-1-methylimidazole (3.4 g.), ethanol (15 ml.) and acetone (45 ml.) was stirred at room temperature for 42 hours. The resultant solid was collected by filtration and crystallized from ethanol-acetone (1:1) to give the product, 6.2 g., M.P. 230–232° C. dec.

What is claimed is:
1. A compound of the formula

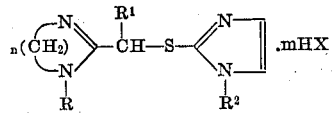

or

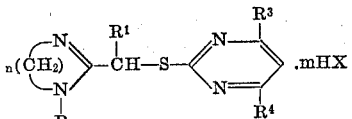

where:

R is H or lower alkyl,
$R^1$ is H, lower alkyl, or phenyl,
$R^2$ is H, or lower alkyl,
$R^3$ and $R^4$ are each independently H, lower alkyl or $NH_2$,
X is chloro or bromo,
n is 2 or 3, and
m is 1 or 2.

2. The compound of claim 1 which is

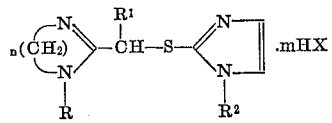

where:

R is H or lower alkyl,
$R^1$ is H, lower alkyl, or phenyl,
$R^2$ is H, or lower alkyl,
X is chloro or bromo,
n is 2 or 3, and
m is 1 or 2.

3. The compound of claim 1 which is

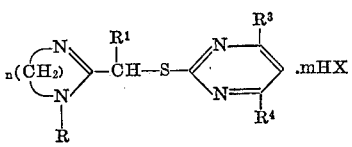

where:

R is H or lower alkyl,
$R^1$ is H, lower alkyl, or phenyl,
$R^3$ and $R^4$ are each independently H, lower alkyl or $NH_2$,
X is chloro or bromo,
n is 2 or 3, and
m is 1 or 2.

4. The compound of claim 2 which is 2-(2-imidazolin-2-ylmethylthio)imidazole dihydrochloride.
5. The compound of claim 2 which is 2-(1-methyl-2-imidazolin-2-ylmethylthio)imidazole dihydrochloride.
6. The compound of claim 2 which is 1-methyl-2-(2-imidazolin-2-ylmethylthio)imidazole dihydrochloride.
7. The compound of claim 2 which is 1-methyl-2-[1-(2-imidazolin-2-yl)ethylthio]imidazole dihydrochloride.
8. The compound of claim 2 which is 1-methyl-2-[2-(1-methyl-2-imidazolin-2-yl)methylthio]imidazole dihydrochloride.
9. The compound of claim 2 which is 2-[α-(2-imidazolin-2-yl)benzylthio]imidazole dihydrochloride.
10. The compound of claim 3 which is 2-(2-imidazolin-2-ylmethylthio)pyrimidine hydrochloride.
11. The compound of claim 3 which is 2-(2-imidazolin-2-ylmethylthio)-4-methyl-pyrimidine hydrochloride.
12. The compound of claim 3 which is 4,6-diamino-2-(2-imidazolin-2-ylmethylthio)pyrimidine dihydrochloride.
13. The compound of claim 3 which is 2-[α-(2-imidazolin-2-ylbenzylthio)]-pyrimidine hydrochloride.
14. The compound of claim 2 which is 2-(3,4,5,6-tetrahydropyrimidine - 2 - ylmethylthio)imidazole dihydrochloride.

15. The compound of claim 2 which is 1-methyl-2-(3,4,5,6-tetrahydropyrimidin - 2 - ylmethylthio)imidazole dihydrochloride.

References Cited

UNITED STATES PATENTS

| | | | |
|---|---|---|---|
| 3,186,990 | 6/1965 | Hensley et al. | 260—309.6 |
| 3,190,887 | 6/1965 | Hensley et al. | 260—309.6 |
| 3,334,112 | 8/1967 | Wright et al. | 260—309.6 |
| 3,454,572 | 7/1969 | D'Amico | 260—256.5 |

ALEX MAZEL, Primary Examiner

R. J. GALLAGHER, Assistant Examiner

U.S. Cl. X.R.

260—309.6; 424—251